United States Patent [19]
Rieder

[11] Patent Number: 5,769,718
[45] Date of Patent: Jun. 23, 1998

[54] VIDEO GAME APPARATUS AND MEDIUM READABLE BY A COMPUTER STORED WITH VIDEO GAME PROGRAM

[76] Inventor: William R. Rieder, c/o Konami Computer Entertainment Chicago Inc. 900 Deerfield Pkwy., Buffalo Grove, Ill. 60089-4510

[21] Appl. No.: 648,418

[22] Filed: May 15, 1996

[51] Int. Cl.$^6$ ........................................ G09G 3/00
[52] U.S. Cl. ................................. 463/31; 463/32
[58] Field of Search ................................. 463/30, 31, 32, 463/33, 34; 364/578; 273/440; 472/62; 345/7, 9, 418, 429

[56] References Cited

U.S. PATENT DOCUMENTS

| | | | |
|---|---|---|---|
| 5,393,074 | 2/1995 | Bear et al. | 273/440 |
| 5,590,062 | 12/1996 | Nagamitsu et al. | 364/578 |

*Primary Examiner*—George Manuel
*Attorney, Agent, or Firm*—Greenblum & Bernstein P.L.C.

[57] ABSTRACT

A game executing unit 31 instructs a player character's image data generating unit 32 to display a display position of a player character. A background's image data generating unit 37 generates background's image data for displaying a background's image of a game space consisting of a floor and walls as a bird's-eye view: A player character's position specifying unit 34 checks whether the display position of the player character is hidden behind the wall or the floor in the background's image of the game space. An image synthesizing unit 38 synthesizes the image data of the player character with the background image of the game space. When the player character position specifying unit 34 determines that the display position of the player character is hidden behind the wall or the floor, the image synthesizing unit 38 modifies the image data so that the wall or the floor concealing the player character is made semitransparent and the rear thereof is displayed.

2 Claims, 7 Drawing Sheets

F I G. 5
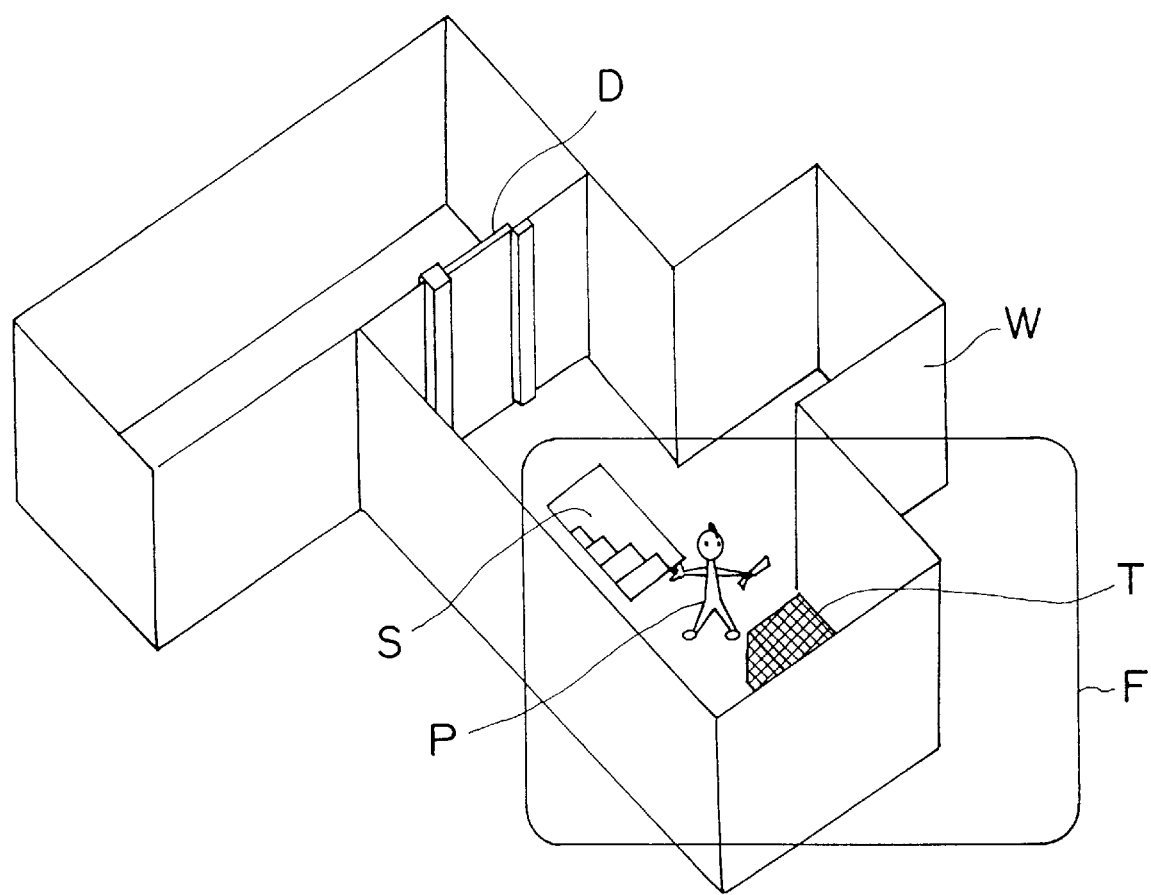

F I G. 6
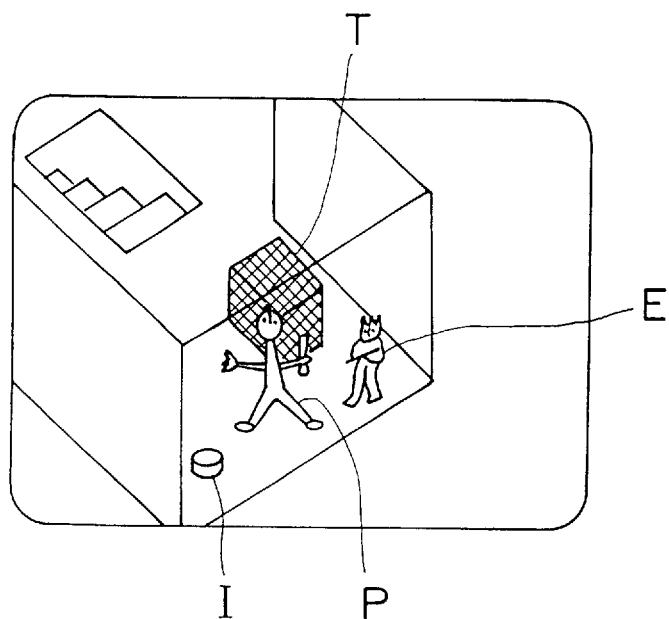
F I G. 7
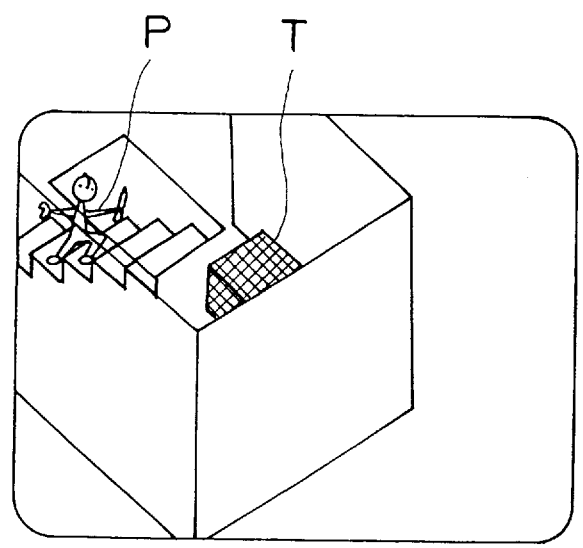

VIDEO GAME APPARATUS AND MEDIUM READABLE BY A COMPUTER STORED WITH VIDEO GAME PROGRAM

BACKGROUND OF THE INVENTION

1. Field of the Invention

The present invention relates to a video game apparatus for executing a video game performed in a three-dimensional virtual space defined by walls and a floor, and also to a medium readable by a computer stored with a video data program for executing the video game.

2. Prior Art

In the field of so-called shooting and roll playing games, there is practiced a game of such a type that a three-dimensional virtual space (which is hereinafter termed a "game space") partitioned by a floor and walls is defined, and a story is developed in this game space.

FIG. 8 is a view of one example thereof and illustrates an image displayed on a TV monitor in the course of progression of the game. Referring to FIG. 8, 105 denotes a frame of the image displayed on the TV monitor. 100 denotes a floor of the game space, 101a–101c denote walls of the game space. 102 denotes a door formed in the wall 101c. 103 denotes a weapon (gun) of a protagonist of the game. 104 denotes an antagonist character. Note that the door 102 is openable and closable. When the protagonist opens this door 102, he or she is able to pass through the door 102 and transfer to a game space defined beyond the wall 101c.

According to the game shown in FIG. 8, the story is developed with a game player himself or herself being the protagonist, a viewpoint at the image displayed on the display unit is coincident with a viewpoint of the protagonist in the game space. Accordingly, even if the antagonist character and a power-up item are hidden in the space beyond the wall 101c, there is no rationality to show them as if to be viewed from this side of the wall 101c, and it may be enough to display it just when the protagonist moves beyond the wall 101c.

Such a viewpoint is, however, hard to grasp every aspect of the image in the game space, and it can be therefore considered that the game space is displayed as a bird's-eye view by shifting the viewpoint of the game player up to an obliquely upper position. In this case, it follows that the viewpoint of the game player himself or herself is shifted outwardly of the game space. Hence, a player character whose motion is controlled by the game player and which receives an attack by the antagonist character is displayed in the game space.

When the game space is displayed as the bird's eye view, however, there must be produced an area invisible from the game player which is hidden behind the wall, i.e., the area that can not be displayed on the TV monitor. Then, if the player character enters this invisible area, the game player is unable to confirm a figure of this player character, and it is therefore impossible to operate the player character.

Further, a visual field of the player character is different from a visual field of the game player, i.e., an image of the game space displayed on the TV monitor. Therefore, even the area invisible to the game player because of being hidden behind the wall might be visible from the viewpoint of the player character. In such a case, it is irrational in terms of developing the story of the game that the player character receives a surprise attack from the antagonist character existing in the invisible area, or that the power-up item, etc. existing in the invisible area is overlooked.

SUMMARY OF THE INVENTION

It is a primary object of the present invention, which was contrived in view of the above problems, to provide a video game apparatus displaying a game space as a bird's-eye view on a TV monitor, which can show a figure of a player character defined as an existence within the game space and image of a range of a visual field of the player character, irrespective of existences of a floor and walls which partition the game space, and also provide a medium readable by a computer stored with such a video game.

To obviate the above-mentioned problems, a video game apparatus according to claim 1 of the present invention comprises a player image data generating unit for generating image data of a player character, a background image data generating unit for generating image data of a background which expresses a floor and walls partitioning a virtual three-dimensional space as a bird's-eye view. The video game apparatus also comprises a player character's position determining unit for determining a position of the player character in the virtual three-dimensional space in accordance with an operation made by a game player, and an image synthesizing unit for synthesizing the image data of the player character generated by the player image data generating unit with the image data of the background generated by the background image data generating unit in accordance with the position determined by the player character position determining unit. The video game apparatus further comprises an image data processing unit for processing, if the position of the player character in the virtual three-dimensional space that is determined by the player character position determining unit is a position hidden behind the floor or the wall, the image data synthesized by the image synthesizing unit so that the floor or the wall concealing the player character is transparentized, and the rear of the wall or the floor is displayed.

To obviate the above-mentioned problems, according to claim 2 of the present invention, a medium readable by a computer is stored with a video game program. The video game comprises a player character's position determining step of determining a position of a player character in a virtual three-dimensional space in accordance with an operation made by a game player, and a player image data generating step of generating image data of the player character. The video game also comprises a background's image data generating step of generating image data of a background which expresses a floor and walls partitioning a virtual three-dimensional space as a bird's-eye view, and a image synthesizing step of synthesizing the image data of the player character generated in the player image data generating step with the image data of the background generated in the background's image data generating step in accordance with the position determined in the player character position determining step. The video game further comprises a image data processing step of processing, if the position of the player character in the virtual three-dimensional space that is determined in the player character's position determining step is a position hidden behind the floor or the wall, the image data synthesized in the image synthesizing step so that the floor or the wall concealing the player character is transparentized, thereby the rear of the wall or the floor is displayed. The video game still further comprises a displaying step of displaying the image data processed in the image data processing step.

BRIEF DESCRIPTION OF THE DRAWINGS

FIG. 5 is a view showing image data of background in a game space that are generated based on the map data shown in FIG. 4;

FIG. 6 is a view showing an example of an image displayed when a display position of a player character is hidden behind a wall;

FIG. 7 is a view showing an example of the image displayed when the display position of the player character is hidden behind a floor.

DETAILED DESCRIPTION OF THE PREFERRED EMBODIMENTS

An embodiment of the present invention will hereinafter be described with reference to the accompanying drawings.

Figure 1:
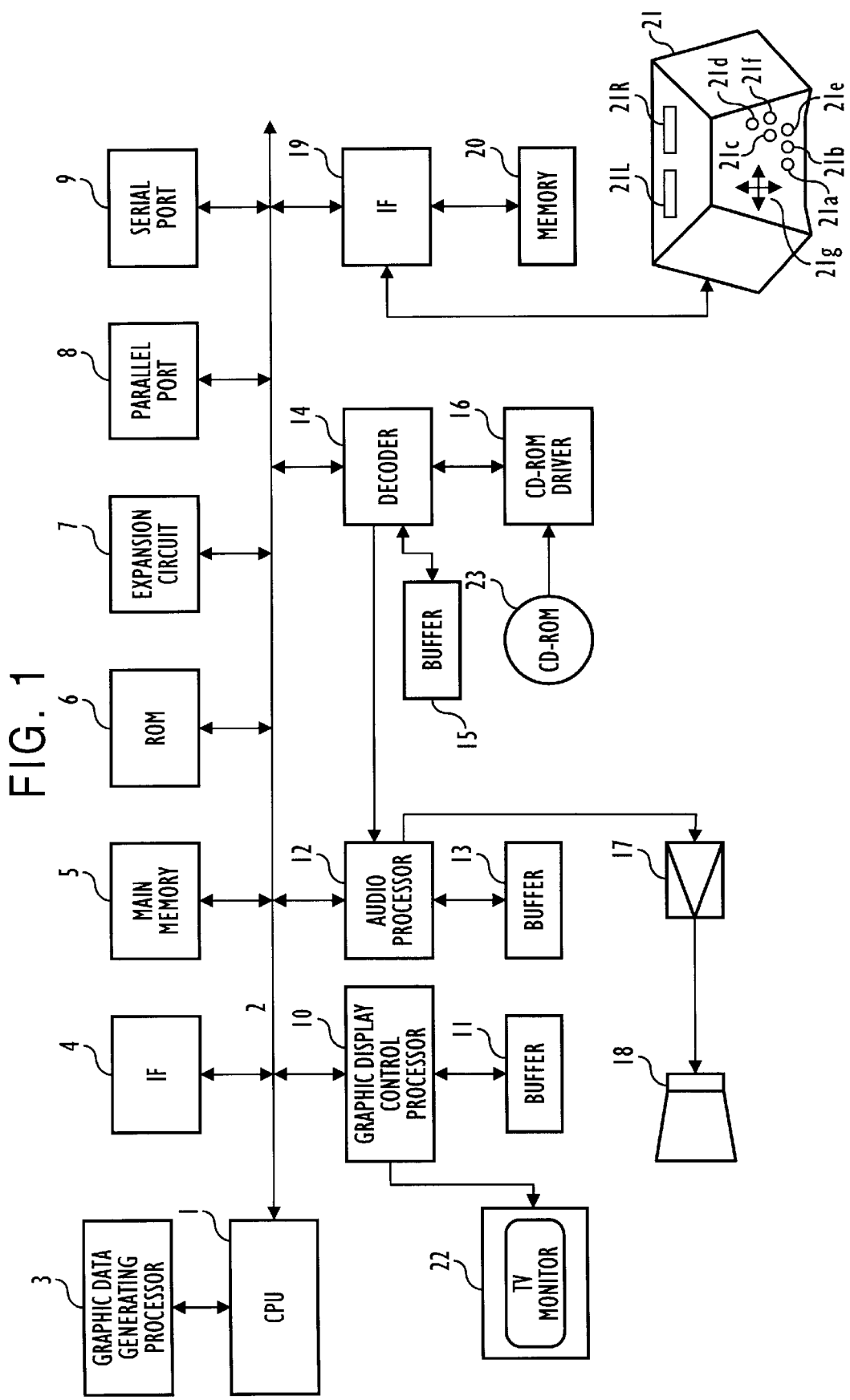
FIG. 1 is a block diagram illustrating a video game apparatus in accordance with an embodiment of the present invention.

FIG. 1 is a block diagram illustrating a video game apparatus or executing a video game, which loaded with a medium readable by a computer in accordance with the embodiment of the present invention.

This video game apparatus is constructed of an apparatus body and a controller 21. This apparatus body is loaded with a CD-ROM 23 serving as the medium readable by a computer which is stored with a game program, and is connected to a TV monitor 22.

The apparatus body comprises a CPU 1 and a graphic data generation processor 3 connected directly to the CPU 1. The apparatus body also comprises an interface circuit 4, a main memory 5, a ROM 6, an expansion circuit 7, a parallel port 8, a serial port 9, a graphic display control processor 10, an audio processor 12, a decoder 14 and an interface circuit 19, which are mutually connected via buses (which are an address bus, a data bus and a control bus) to the CPU 1. The apparatus body further comprises a buffer 11 connected to the graphic display control processor 10, a buffer 13 and an amplifier circuit 17 that are connected to the audio processor 12, a loud speaker 18 connected to the amplifier circuit 17, a buffer 15 and a CD-ROM driver 16 that are connected to the decoder 14, and a memory 20 connected to the interface circuit 19. The above-mentioned controller 19 is connected to the interface circuit 19. Further, the above-described TV monitor 22 is connected to the graphic display control processor 10.

The graphic data generation processor 3 functions as a co-processor for the CPU 1. More specifically, the graphic data generation circuit 3 performs parallel processing of a coordinate transformation and a light source calculation, e.g., arithmetic operations for vector and matrix in a fixed-point format. Main processes executed by the graphic data generation circuit 3 are a process of obtaining an address of a image to be processed on the display area on the basis of an item of coordinate data, an item of quantity-of-movement data and an item of quantity-of-rotation data about respective apexes within a two- or three-dimensional plane, contained in the image data supplied from the CPU 1, and of transmitting the obtained address data back to the CPU 1. The main processes of the graphic data generation circuit also include a process of calculating a luminance of the image in accordance with an angle and a distance from a virtually set light source.

The interface circuit 4 is a circuit for an interface with a peripheral device and a pointing device such as, e.g., a mouse and a track ball. The ROM 6 stores the program data as an operation system for the apparatus body. The main memory 5 is a memory into which the game program is loaded from the CD-ROM 23. The program and data are paged in the CPU 1 from the main memory 5 in a suitable manner, and processed by the CPU 1.

The expansion circuit 7 expands a image compressed based on intra coding pursuant to MPEG (moving Image Engineering Group) or JPEG (Joint Image Engineering Group). The expanding process may include a decoding process (of decoding the data encoded based on Variable Length Code (VLC)), an inverse quantizing process, an inverse discrete cosine transform (IDCT) process, and a restoring process of an intra image.

The graphic display control processor 10 executes a drawing process for the buffer 1 on the basis of a drawing instruction issued by the CPU 1 and outputs the image drawn within the buffer 11 to the TV monitor 22. The buffer 11 consists of a display area and a non-display area. The display area is an area in which the data displayed on a display screen of the TV monitor 22 is developed. The non-display area is an area for storing texture data and color pallet data. Herein, the texture data is defined as two-dimensional image data. The color pallet data is data for specifying a color of the texture data. The drawing instruction issued by the CPU 1 may be, e.g., that for drawing lines, that for drawing a three-dimensional image by use of polygons, and that for drawing an ordinary two-dimensional image.

The audio processor 13 stores the buffer 14 with ADPCM data read from the CD-ROM 23 and reads the ADPCM data stored in the buffer 14 with a clock having a frequency of, e.g., 44.1 KHz. The audio processor 13 then executes processes such as changing a pitch, adding noises, setting an envelop and a level, and adding a reverb with respect to the thus read ADPCM data. If the audio data read from the CD-ROM 23 are defined as PCM data of CD-DA (Compact Disk Digital Audio), etc., the PCM data are converted into the ADPCM data by the audio processor 13. Further, The CDPCM data processed by the audio processor 13 are outputted in the form of voices from the loud speaker 16.

The CD-ROM driver 16 reads the audio data and other items of data such as program data and map data and supplies the decoder 14 with the thus read data.

The decoder 14 performs an error correction process based on ECC (Error Correction Code) with respect to the data regenerated by the CD-ROM driver 16 and supplies the main memory 5 or the audio processor 13 with the error-corrected data.

The memory 20 is classified as a card type memory stored with, when the game is interrupted, a variety of parameters at the interruption of the game in order to hold a status at the time.

The controller 22 has a cross key 21g into which a left key, a right key, an upper key and a lower key are integrally formed, a left button 21L, a right button 21R, a start button 21a, a select button 21b, and first through fourth buttons 21c–21f. The cross key 21g is a key for the game player to input commands for indicating up, down, left and right to the CPU 1. The start button 21a is a key for the game player to indicate the CPU 1 to start the game program loaded from the CD-ROM 23. The select button 21b is a key for the game player to indicate the CPU 1 to perform a variety of selections about the game programs loaded into the main memory 5.

Figure 2:
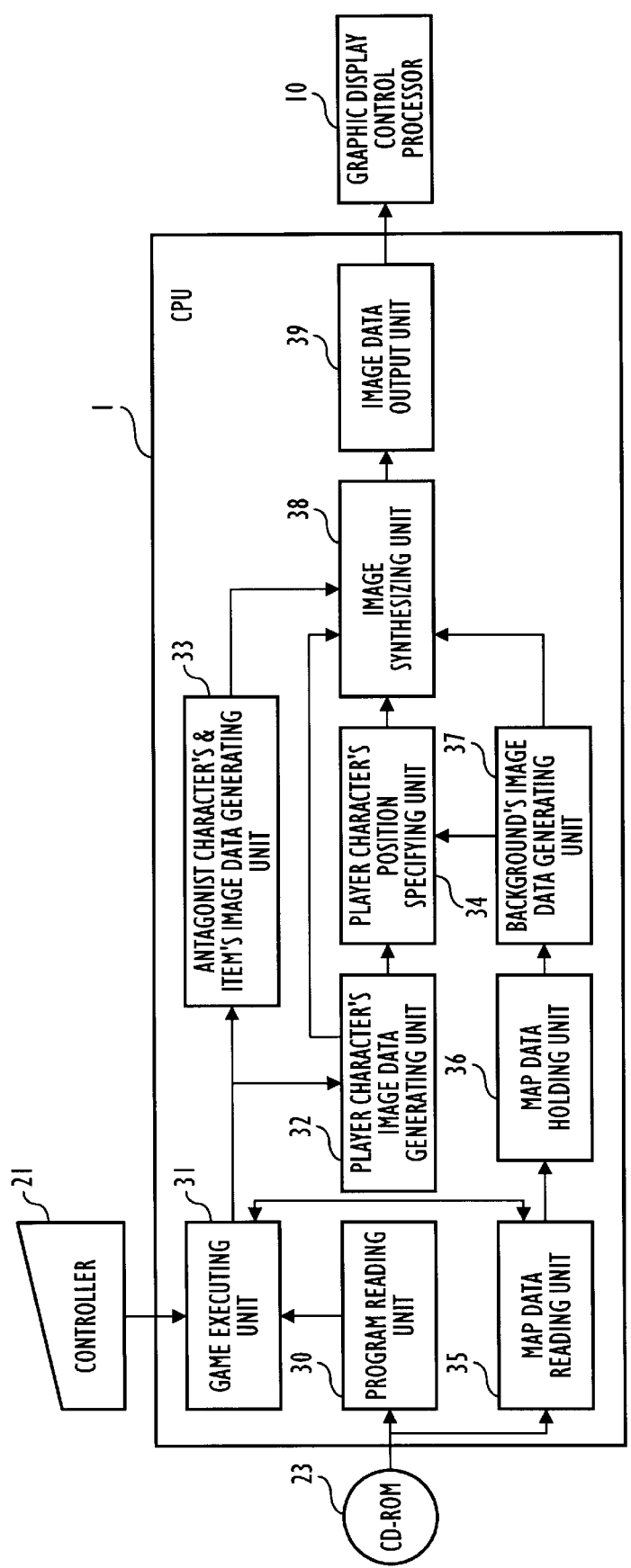
FIG. 2 is a block diagram showing functions within a CPU shown in FIG. 1.

Explained next with reference to FIG. 2 are functions within the CPU 1 which is developed at the time, the game program for the video game and the data (that is the map data) used for execution of this game program in accordance with this embodiment are loaded from the CD-ROM 23 into the main memory. This video game is a game developing a story where the player character strengthens by collecting power-up items and fights with the antagonist character to dominate a structure in the game space assumed as an interior of the structure partitioned by a floor and walls. Incidentally, FIG. 2 shows only the CPU 1, the graphic display control processor 10, the controller 21 and the CD-ROM 23 among the variety of constructive elements of the video game apparatus illustrated in FIG. 1, with other constructive elements being unillustrated therein.

As shown in FIG. 2, the functions developed in the CPU 1 involve a program reading unit 30 for sequentially reading the game programs from the CD-ROM 23 (via the main memory 5), a game executing unit 31 for receiving the game program read by the program reading unit 30 and for receiving input data from the controller 21. The above functions further involve an antagonist character's & item's image data generating unit 33, a player character's image data generating unit 32, and a map data reading unit 35 to which data is inputted from the game executing unit 31. The above functions further involve a map data holding unit 36 to which data is inputted from the map data reading unit 35, a background's image data generating unit 37 to which data is inputted from the map data holding unit 36, and a player character's position specifying unit 34 to which data is inputted from the player character's image data generating unit 32 and from the background's image data generating unit 37. The above-mentioned functions still further involve a image synthesizing unit 38 to which data is inputted from the antagonist character's & item's image data generating unit 33, the player character's image data generating unit 32, the player character's position specifying unit 34 and the background's image data generating unit 37, and also a image data outputting unit 39 to which data is inputted from this image synthesizing unit 38.

The game executing unit 31 serving as a player character's position determining element executes the game program received from the program reading unit 30, wherein the input data from the controller 21 are used as parameters. The game executing unit 31 commands the map data reading unit 35 to read an item of map data with the execution of the game program and logically recognizes the game space on the basis of map data of which the map data reading unit 35 notifies the game executing unit 31. Then, the game executing unit 31 adequately arranges the power-up items and moves the antagonist character (In other words, the game executing unit 31 makes the antagonist character transferred and attack) on the basis of properly generated random numbers in the game space. The game executing unit 31 subsequently moves the player character (In other words, the game executing unit 31 makes the player character transferred, attack, collect the power-up items and open the door) on the basis of the commands inputted by the player through the controller 21. The game executing unit 31 commands the antagonist character's & item's image data generating unit 33 to generate the image data for displaying the antagonist character and the power-up items while specifying display positions thereof at an interval of a predetermined period. Further, the game executing unit 31 commands the player character's image data generating unit 32 to generate the image data for displaying the player character while specifying a display position thereof at an interval of a predetermined period.

Figure 4:
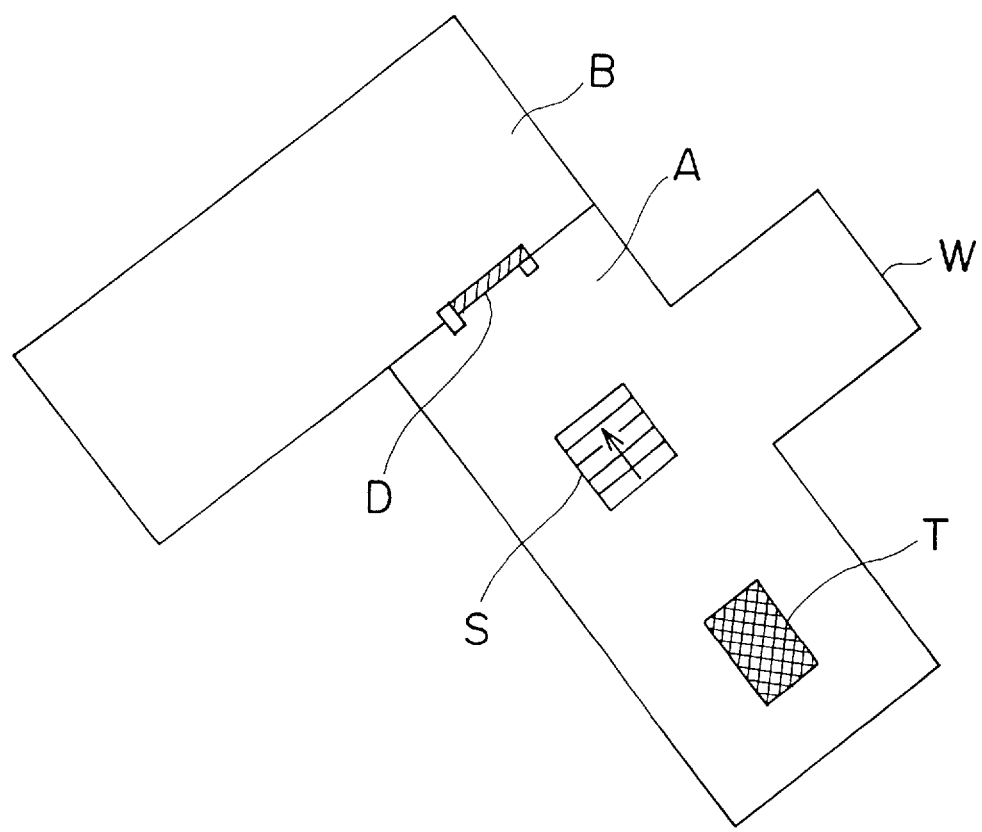
FIG. 4 is a plan view showing map data.
Figure 8:
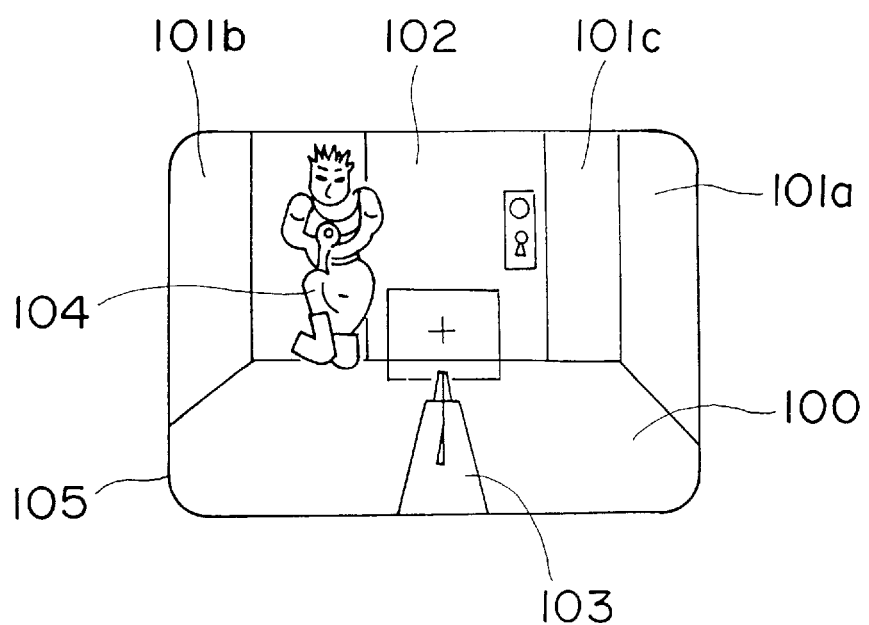
FIG. 8 is a view showing an example of an image displayed by the conventional video game.

The map data reading unit 35 reads the map data out of the CD-ROM 23 in accordance with the command given from the game executing unit 31 and notifies the game executing unit 31 and the map data holding unit 36 of the read map data. This item of map data is, as shown in FIG. 4, defined in the form of a plan view of the floor partly defining the game space. According to this item of map data, a solid line W defines a position of the wall surrounding the periphery of the game space; a graphic S defines stairs to downstairs; a graphic D defines an openable/closable door; and a graphic T defines a piece of fixed furniture. Note that the map data are read from the CD-ROM 23 on the unit of a range whose periphery is surrounded with the wall W and the door D. That is to say, FIG. 4 shows two items of map data consisting of two units A and B.

The map data holding unit 36 is a unit for holding the map data read from the map data reading unit 35. The map data holding unit 36 has a capacity enough to hold the two items of map data at the maximum and disposes of the map data which defines an area far from the present position of the player character each time new map data is read by the map data reading unit 35.

The background's image data generating unit 37 serving as a background's image data generating element generates an item of image data about a background image on the basis of the map data held by the map data holding unit 36, wherein the floor and the walls that define the game space are three-dimensionally expressed as a bird'seye view as shown in FIG. 5. The background image data generating unit 37 then notifies the image synthesizing unit 38 and the player character position specifying unit 34 of the thus generated background image data. On this occasion, the walls W surrounding the periphery of the game space are expressed at the same height. Note that stairs S can be conceived as such a structure that the floors and the walls are precisely combined, and hence, in the following discussion, it is assumed that as far as no specific designation is given, the "walls" include walls constituting the stairs S, and the "floor" includes the walls constituting the stairs S. Further, referring to FIG. 5, the symbol F represents a frame of the display unit of the TV monitor 22.

The antagonist character's & item's image data generating unit 33 generates the image data of the antagonist character and the image data of the power-up items in accordance with the commands given from the game executing unit 31, and notifies the image synthesizing unit 38 of these items of image data while specifying display positions thereof.

The player character's image data generating unit 32 serving as a player character's image data generating element generates the image data of the player character in accordance with the command given from the game executing unit 31. It is to be noted that the player character's position specifying unit 34 is also notified of the display position of the player character.

The player character's position specifying unit 34 constituting a part of a image data processing element checks whether the display position of the player character coincides with a portion hidden behind the wall or the floor or a portion in the vicinity of such a portion in the background's image generated by the background image data generating unit 37. The player character's position specifying unit 34 then notifies the image synthesizing unit 38 of a result of this checking. The checking about whether to be in the vicinity thereof is made based specifically on whether the player character approaches closer to upper or side edges of the image of wall generated by the background image data generating unit 37 than a predetermined spacing.

The image synthesizing unit 38 assembles the antagonist character's image data and the power-up item image data that are notified from the antagonist character's & item's image data generating unit 33, and the player character's image data notified from the player character's position specifying unit 34, into the background's image data notified from the background's image data generating unit 37 (which corresponds to a image synthesizing element). On this assembly, the image synthesizing unit 38 makes an arrangement so that the portions (which are the walls, the floor, the antagonist character, the power-up items, the furniture, etc.) hidden behind the walls or the floor that are included in the background's image data are not displayed in principle. If the player character's position specifying unit 34 gives the notice that the display position of the player character coincides with the portion hidden behind the wall or the floor or a portion in the vicinity of this portion in the background's image generated by the background's image data generating unit 37, however, the wall or the floor superposed on the display position of the player character or located in the vicinity thereof is displayed semitransparently with its background being displayed (which corresponds to an image data processing element). The image synthesizing unit 38 transfers the thus synthesized image data to the image data outputting unit 39.

The image data outputting unit 39 clips an area corresponding to the frame F in the vicinity of the player character out of the image data transferred from the image synthesizing unit 38, and sends it toward the graphic display control processor 10.

Figure 3:
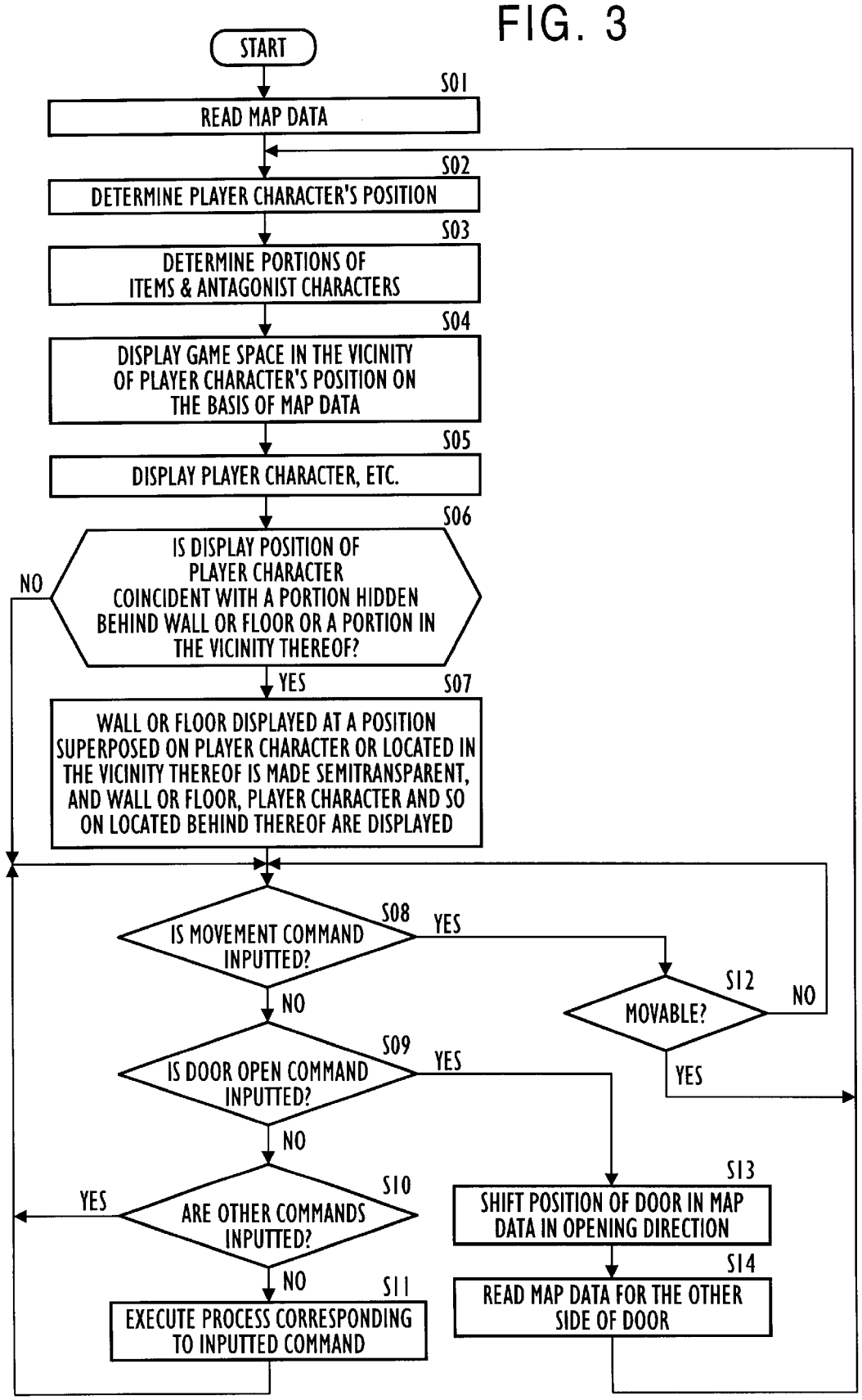
FIG. 3 is a flowchart showing processes executed by the CPU shown in FIG. 1.

Next, the operation of the thus constructed video game apparatus in this embodiment will be explained with reference to FIG. 3 showing a flowchart and FIGS. 5 to 7 showing examples of the image.

The processing in the flowchart shown in FIG. 3 starts when giving an indication of starting the game given through the controller 21. Then, at first, the CPU 1 reads a first item of map data from the CD-ROM 23 (S01), then determines a display position of the player character, and determines display positions of the power-up item and of the antagonist character (S03) (which corresponds to a player character's position determining step).

Next, the CPU 1 displays a background's image in the game space in the vicinity of the display position of the player character on the display screen of TV monitor 22 on the basis of the map data read in step S01 or S14 (S04) (which corresponds to a background's image data generating step). Subsequently, the player character is displayed in the display position determined in step S02, and the power-up item and the antagonist character are displayed in the respective display positions determined in step S03 (S05) (which corresponds to a image synthesizing step).

Next, the CPU 1 checks whether the display position of the player character P coincides with the portion hidden behind the wall or the floor or exists in the vicinity of this portion in the background's image (S06). Then, as illustrated in FIG. 5, if the display position of the player character P is farther from the portion hidden behind the wall or the floor in the background's image than the predetermined spacing, the CPU 1 proceeds the processing directly to step S08.

Contrastingly if the display position of the player character P coincides with the portion hidden behind the wall or the floor in the background's image, or if the display position of the player character P is in the vicinity of the portion hidden behind the wall or the floor in the background's image, the CPU 1 displays the wall or the floor superposed on the display position of the player character P or located in the vicinity thereof semitransparently, and also displays the floor, the wall, the player character P, an antagonist character E and a power-up item I that are located behind the above wall or floor, as illustrated in FIG. 6 (showing a case where the player character P is hidden behind the wall W) or FIG. 7 (showing a case where the player character P is hidden behind the floor) (S07) (which corresponds to an image data processing step). The CPU 1 proceeds the processing to step S08.

In step S08, the CPU 1 checks whether the player has inputted a movement command through the controller 21 (S08). Then, if the movement command has been inputted, the CPU 1 checks whether a movement conforming to this movement command is possible or not (S12). Then, if the movement is impossible as in the case of the wall W existing in a portion to which the player character shall move, the CPU 1 returns the processing to step S08. Whereas if the movement is possible, the CPU 1 returns the processing to step S02, wherein a player character's position corresponding to the movement command is determined.

In contrast with the above-mentioned, if no movement command is inputted, the CPU 1 checks whether the player inputted a door open command (S09). This door open command has inputted when the player character contacts a switch (unillustrated) displayed in close proximity to the door D. Then, if the door open command has been inputted, the CPU 1 shifts, in an opening direction, a position of the door D in the map data read in step S01 or S14 (S13), reads the map data corresponding to the other side of the door D from the CD-ROM 23 (S14), and returns the processing to step S02. As a result, the game space on the other side of the door D is displayed on the display screen of the TV monitor 22.

Whereas if the door open command has not been inputted, the CPU 1 checks whether the player has inputted other command through the controller 21 (S10). Then, if other commands have been inputted, the CPU 1 executes processes corresponding to the other inputted commands (S11), and returns the processing to step S08.

Whereas if other commands has not been inputted, the CPU 1 returns the processing directly to step S08.

According to the game apparatus in this embodiment discussed above, although the video game is played in such a manner that the virtual game space partitioned by the walls and the floor is displayed as a bird's-eye view, and that the player character P is made to move in this game space corresponding to the commands given by the player, the portions hidden behind the walls and the floor can be displayed with these walls and floor displayed semitransparently in the display position of the player character and in the vicinity thereof. Accordingly, the player is capable of visually recognizing the figure of the player character P and recognizing the image of the portion which must be visible if from the view point of the player character P. Besides, the walls and the floor remain non-transparent in the portions unrelated to the motions of the player character, and consequently there is no trouble making the image complicated unnecessarily. Accordingly, the player is able to enjoy the game without feeling any sense of incongruity.

According to the present invention having the above-described construction, although the game space is displayed as a bird's-eye view, and the figure of the player character defined as an existence in the game space and the range of the visual field of the player character can be displayed on the TV monitor irrespective of the existences of the walls and the floor which partition the game space.

What is claimed is:

1. A video game apparatus comprising:

player image data generating means for generating image data of a player character;

background's image data generating means for generating image data of a background that expresses a floor and walls partitioning a virtual three-dimensional space as a bird's-eye view;

player character's position determining means for determining a position of the player character in the virtual three-dimensional space in accordance with an operation made by a game player;

image synthesizing means for synthesizing the image data of the player character generated by said player image data generating means with the image data of the background generated by said background's image data generating means in accordance with the position determined by said player character's position determining means; and image data processing means for processing, if the position of the player character in the virtual three-dimensional space that is determined by said player character's position determining means is a position hidden behind by the floor or the wall, the image data synthesized by said image synthesizing means so that the floor or the wall concealing the player character is transparentized, thereby and the rear of the wall or the floor is displayed.

2. A medium readable by a computer stored with a video game program comprising:

a player character's position determining step of determining a position of a player character in a virtual three-dimensional space in accordance with an operation made by a game player;

a player image data generating step of generating image data of the player character;

a background's image data generating step of generating image data of a background which expresses a floor and walls partitioning a virtual three-dimensional space as a bird's-eye view;

an image synthesizing step of synthesizing the image data of the player character generated in said player image data generating step with the image data of the background generated in said background's image data generating step in accordance with the position determined in said player character's position determining step;

an image data processing step of processing, if the position of the player character in the virtual three-dimensional space that is determined in said player character's position determining step is a position hidden behind the floor or the wall, the image data synthesized in said image synthesizing step so that the floor or the wall concealing the player character is transparentized, thereby the rear of the wall or the floor is displayed; and a displaying step of displaying the image data processed in said image data processing step.

* * * * *